United States Patent [19]

Ieki

[11] Patent Number: 6,094,307
[45] Date of Patent: Jul. 25, 2000

[54] OPTICAL GRATING AND ENCODER

[75] Inventor: Atsushi Ieki, Gifu, Japan

[73] Assignee: Okuma Corporation, Nagoya, Japan

[21] Appl. No.: 08/650,906

[22] Filed: May 17, 1996

[51] Int. Cl.[7] .............. G02B 5/18; G01B 11/00; G01B 11/14; H01J 3/14

[52] U.S. Cl. ............ 359/569; 359/575; 250/237 G

[58] Field of Search .................. 359/569, 575, 359/566; 250/237 G

[56] References Cited

U.S. PATENT DOCUMENTS

| 4,667,099 | 5/1987 | Arai et al. ............ 250/237 G |
| 5,068,530 | 11/1991 | Ieki et al. ............. 250/237 G |
| 5,182,613 | 1/1993 | Ieki et al. ............. 250/237 G |
| 5,422,723 | 6/1995 | Paranjpe et al. ......... 356/355 |
| 5,428,445 | 6/1995 | Holzapel ............... 350/237 G |
| 5,528,364 | 6/1996 | Koike .................. 359/575 |

FOREIGN PATENT DOCUMENTS

| 46-19819 | 6/1971 | Japan ................. 359/569 |
| 48202 | 2/1982 | U.S.S.R. ............. 359/569 |

*Primary Examiner*—Jon W. Henry
*Attorney, Agent, or Firm*—Wenderoth, Lind & Ponac

[57] ABSTRACT

An encoder has the capability of outputting a stable displacement signal with small distortion. The encoder includes a first scale and a second scale. The first or second scale has a scale pattern in which pattern elements are arranged in such a manner that the spacings between adjacent pattern elements are not constant but vary in phase relative to the reference phase of a reference pattern element by amounts of $P/(2 \cdot L)$, $P/(2 \cdot m)$, $P/(2 \cdot n)$, $P/(2 \cdot o)$, . . . (L, m, n, o, . . . are positive integers, P is the mean pattern period) and by amounts of combinations of sums of these values.

8 Claims, 9 Drawing Sheets

| | P/2o | P/2n | P/2m | P/2L |
|---|---|---|---|---|
| φ0 | 0 | 0 | 0 | 0 |
| φ1 | 0 | 0 | 0 | 1 |
| φ2 | 0 | 0 | 1 | 0 |
| φ3 | 0 | 0 | 1 | 1 |
| φ4 | 0 | 1 | 0 | 0 |
| φ5 | 0 | 1 | 0 | 1 |
| φ6 | 0 | 1 | 1 | 0 |
| φ7 | 0 | 1 | 1 | 1 |
| φ8 | 1 | 0 | 0 | 0 |
| φ9 | 1 | 0 | 0 | 1 |
| φa | 1 | 0 | 1 | 0 |
| φb | 1 | 0 | 1 | 1 |
| φc | 1 | 1 | 0 | 0 |
| φd | 1 | 1 | 0 | 1 |
| φe | 1 | 1 | 1 | 0 |
| φf | 1 | 1 | 1 | 1 |

FIG.4

|     | P/2p | P/2o | P/2n | P/2m | P/2L |
|-----|------|------|------|------|------|
| φ0  | 0 | 0 | 0 | 0 | 0 |
| φ1  | 0 | 0 | 0 | 0 | 1 |
| φ2  | 0 | 0 | 0 | 1 | 0 |
| φ3  | 0 | 0 | 0 | 1 | 1 |
| φ4  | 0 | 0 | 1 | 0 | 0 |
| φ5  | 0 | 0 | 1 | 0 | 1 |
| φ6  | 0 | 0 | 1 | 1 | 0 |
| φ7  | 0 | 0 | 1 | 1 | 1 |
| φ8  | 0 | 1 | 0 | 0 | 0 |
| φ9  | 0 | 1 | 0 | 0 | 1 |
| φa  | 0 | 1 | 0 | 1 | 0 |
| φb  | 0 | 1 | 0 | 1 | 1 |
| φc  | 0 | 1 | 1 | 0 | 0 |
| φd  | 0 | 1 | 1 | 0 | 1 |
| φe  | 0 | 1 | 1 | 1 | 0 |
| φf  | 0 | 1 | 1 | 1 | 1 |
| φ10 | 1 | 0 | 0 | 0 | 0 |
| φ11 | 1 | 0 | 0 | 0 | 1 |
| φ12 | 1 | 0 | 0 | 1 | 0 |
| φ13 | 1 | 0 | 0 | 1 | 1 |
| φ14 | 1 | 0 | 1 | 0 | 0 |
| φ15 | 1 | 0 | 1 | 0 | 1 |
| φ16 | 1 | 0 | 1 | 1 | 0 |
| φ17 | 1 | 0 | 1 | 1 | 1 |
| φ18 | 1 | 1 | 0 | 0 | 0 |
| φ19 | 1 | 1 | 0 | 0 | 1 |
| φ1a | 1 | 1 | 0 | 1 | 0 |
| φ1b | 1 | 1 | 0 | 1 | 1 |
| φ1c | 1 | 1 | 1 | 0 | 0 |
| φ1d | 1 | 1 | 1 | 0 | 1 |
| φ1e | 1 | 1 | 1 | 1 | 0 |
| φ1f | 1 | 1 | 1 | 1 | 1 |

FIG.8

OPTICAL GRATING AND ENCODER

BACKGROUND OF THE INVENTION

1. Field of the Invention

The present invention relates to an optical grating for use in an encoder or a spectroscope and also relates to an encoder used for position measurement or for use in a machine tool or a semiconductor production apparatus.

2. Description of the Prior Art

In conventional optical encoders, a second diffraction grating (hereinafter also referred to simply as a "second grating") is disposed at the back of a first diffraction grating (hereinafter referred to simply as a "first grating") in such a manner that the second diffraction grating can move in a direction parallel to the longer sides of the first diffraction grating. Furthermore, a photoelectric conversion element is disposed at the back of the second grating. The first grating and the second grating have an optical grating (hereinafter referred to as a "grating part") including light transmitting portions (hereinafter referred to as "transparent portions") and portions opaque to light (hereinafter referred to as "opaque portions") which are alternatively disposed at predetermined intervals (hereinafter such an interval will be referred to as the "grating pitch") as shown in FIG. 1.

In the above structure, when the first grating is illuminated by a parallel light ray L, the photoelectric conversion element is illuminated by the light which has passed through both the first and second gratings. The photoelectric conversion element generates an electric signal corresponding to the intensity of the incident light, and outputs the resultant electric signal. The electric signal varies in accordance with the change in the amount of light passing through the first and second gratings, wherein the amount of light passing through the first and second gratings varies depending on the relative displacement between the first and second gratings. The displacement signal is ideally in the form of a triangular-waveform signal proportional to the apparent transparent portion seen from the light source side, wherein the apparent transparent portion varies depending on the degree of overlap between the first and second gratings. In practice, however, the displacement signal contains various distortion components caused by the diffraction of light or the like. Therefore, in a practical position detecting operation, the above signal is regarded as a pseudo sinusoidal signal.

In the conventional optical encoder using the conventional grating part shown in FIG. 1, the detected value representing the position obtained from the displacement signal includes a great division error. Furthermore, in the conventional optical encoder described above, the degree of distortion of the displacement signal greatly varies depending on the change in the spacing between the first and second gratings. Therefore, to maintain the error within an allowable small range, it is required to maintain the distance between the first grating and the second grating at a proper fixed value. This means that extremely high precision is required in attachment of the first grating and the second grating.

To avoid the above problem, the inventors of the present invention have proposed an optical encoder having a grating pattern in which, to prevent nth-order distortion components, pattern elements are arranged such that the spacings between adjacent pattern elements are not constant but vary in phase by predetermined amounts (Japanese Patent Laid-Open No. 3-48122 (1991)). Japanese Patent Laid-Open No. 3-48122 cited above discloses a pattern which can remove 3rd- and 5th-order harmonic distortion components, which cause error. It also discloses that 7th- and higher-order harmonic distortion components can also be removed by a similar construction.

Although it is not disclosed in the Japanese Patent Laid-Open No. 3-48122 cited above, it is also possible to remove 2nd- and other even-order distortion components in the same manner as that disclosed therein. However, the even-order distortion components are very small. Besides, in common optical encoders, the even-order distortion components are removed when a difference between the signal and its opposite-phase signal is taken to generate a final output signal. If it is attempted to remove the 2nd- order distortion component, as great as a 30% reduction occurs in gain. Therefore, such an attempt is meaningless. However, in recent applications, it is required to remove higher-order harmonic distortion components, such as 3rd-, 5th-, 7th-, 9th, 11th-, 13th-order harmonic distortion components, as well as low-order distortion components.

As described above, it is possible to remove the even-order harmonic distortion components by taking the difference between a signal and its opposite-phase signal. However, it is more desirable to remove the even-order harmonic distortion components by an easy technique rather than using the pattern arrangement disclosed in the Japanese Patent Laid-Open No. 3-48122 cited above. As for the grating part, it is known in the art to change the transmittance continuously in such a manner as to form a sinusoidal grating which includes no distortion components. This makes it possible to obtain a displacement signal having no distortion. However, in practice, the sinusoidal grating is difficult to produce, and thus it is not used in practical applications.

SUMMARY OF THE INVENTION

In view of the above, it is an object of the present invention to provide an optical grating of the transmission binary amplitude grating type which produces less distortion than conventional optical grating. It is another object of the present invention to provide an encoder having the capability of outputting a stable displacement signal with small distortion.

According to one aspect of the present invention, there is provided a transmission amplitude grating having slits which are arranged to have a pattern in which the spacings between adjacent slits are not constant, but vary in phase relative to a slit having a reference phase by amounts of P/(2·L), P/(2·m), P/(2·n), P/(2·o), . . . (L, m, n, o, . . . are positive integers, P is a mean pattern period) and by amounts of combinations of sums of these values. According to another aspect of the present invention, there is provided an encoder used for position measurement in a machine tool or a semiconductor production apparatus. The encoder includes a first scale and a second scale which moves relative to the first scale wherein the first or second scale has a scale pattern in which pattern elements are arranged in such a manner that the spacings between adjacent pattern elements are not constant but vary in phase relative to a pattern element having a reference phase by amounts of P/(2·L), P/(2·m), P/(2·n), P/(2·o), . . . (L, m, n, o, . . . are positive integers, P is the mean pattern period) and by amounts of combinations of sums of these values.

According to still another aspect of the invention, there is provided an encoder including a photo-detecting device having a photo-detecting pattern formed thereon in which pattern elements are arranged in such a manner that the spacings between adjacent pattern elements are not constant but vary in phase relative to a reference phase by amounts of P/(2·L), P/(2·m), P/(2·n), P/(2·o), . . . (L, m, n, o, . . . are positive integers, P is the mean pattern period) and by amounts of combinations of sums of these values.

BRIEF DESCRIPTION OF THE DRAWINGS

In the accompanying drawings:

FIG. 4 is a table illustrating a method of determining phase differences introduced in the pattern shown in the first embodiment shown in FIG. 2;

FIG. 8 is a table illustrating a method of determining phase differences introduced in the pattern shown in the second embodiment shown in FIG. 6.

DESCRIPTION OF THE PREFERRED EMBODIMENTS

In the present invention, as described above, the spacings between adjacent pattern elements are not constant but vary in phase relative to a pattern element having a reference phase by amounts of P/(2·L), P/(2·m), P/(2·n), P/(2·o), . . . , and by amounts of combinations of sums of these values, so that a wide range of distortion components from low-order distortion components to high-order distortion components are all removed. Furthermore, a pattern is formed on a photo-detecting device so that the pattern can remove distortion, and thus no even-order harmonic distortion components are generated.

Figure 1:
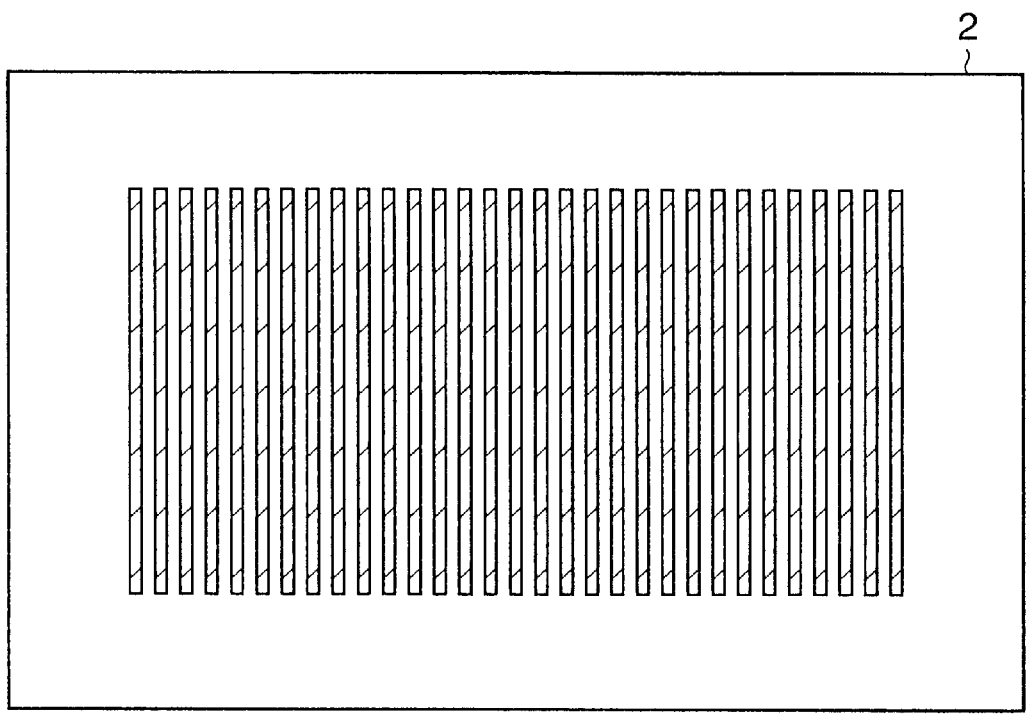
FIG. 1 is a schematic diagram illustrating an example of a grating part used in a conventional optical encoder.
Figure 2:
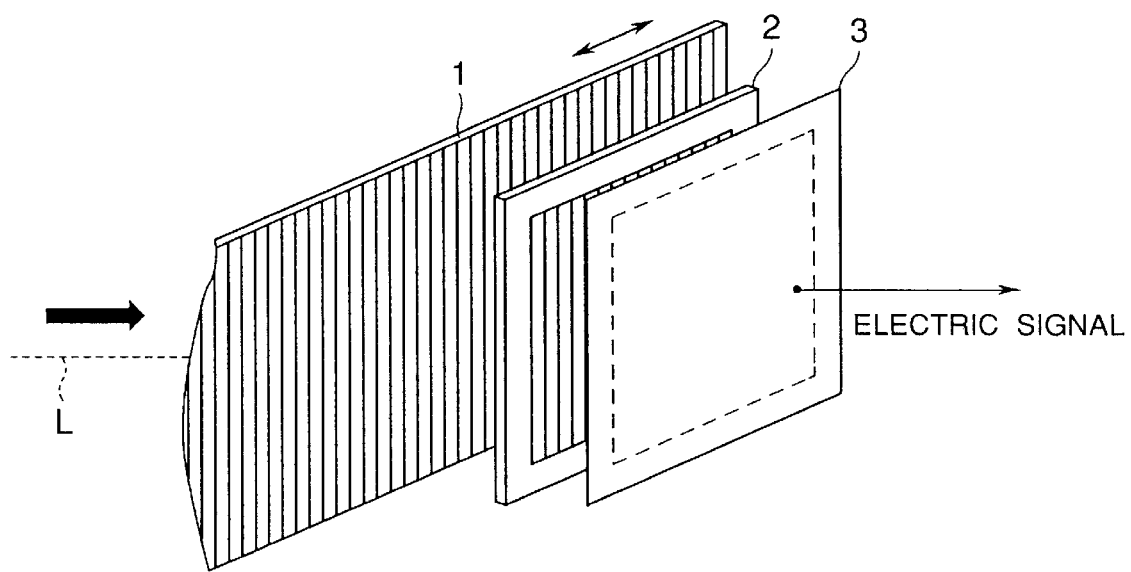
FIG. 2 is a perspective view illustrating a first embodiment of an encoder according to the present invention.

FIG. 2 is a perspective view illustrating a first embodiment of an optical encoder provided with an optical grating according to the present invention. The optical encoder includes a first diffraction grating (hereinafter referred to as "first grating") 1; a second diffraction grating (hereinafter referred to as "second grating") 2 disposed at the back of the first grating 1, the second grating being adapted to move relative to the first grating 1 in a direction denoted by the arrow in FIG. 2; and a photoelectric conversion device 3 disposed at the back of the second grating 2. The second grating 2 of this optical encoder has an optical grating (hereinafter referred to as "grating part") such as that shown in FIG. 3.

Figure 3:
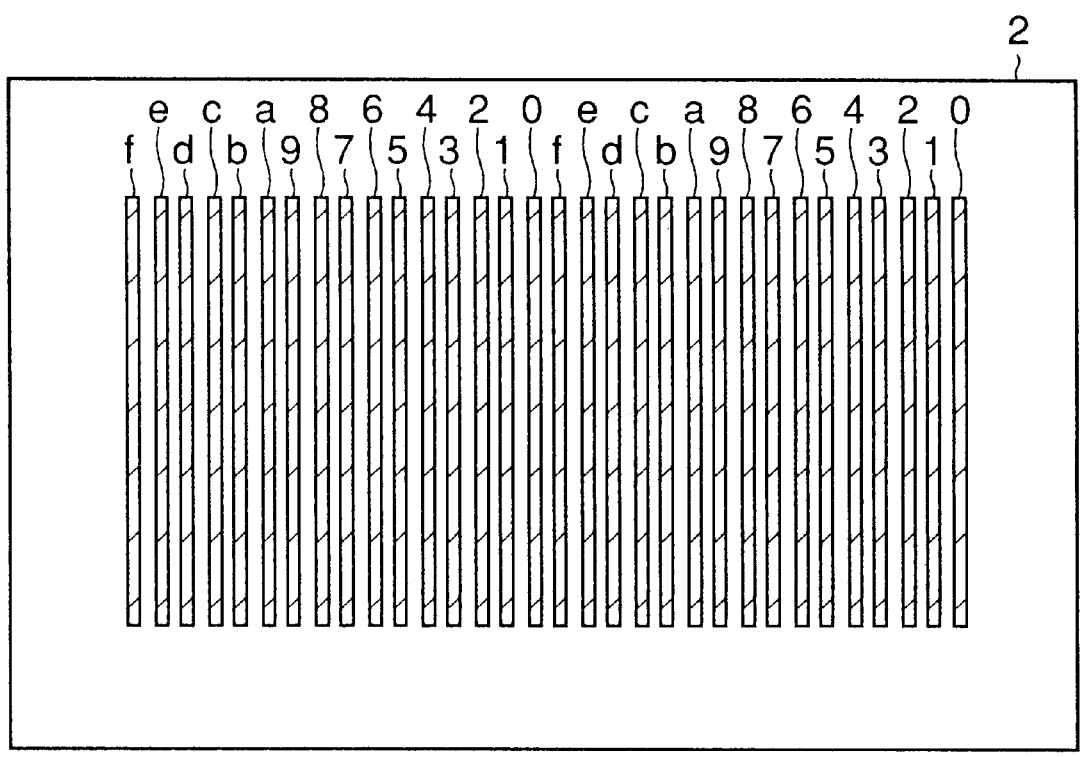
FIG. 3 is a schematic diagram illustrating an example of a grating part used in the first embodiment shown in FIG. 2.

In the grating part shown in FIG. 3, pattern elements are arranged with a mean spacing of a few μm to a few hundred μm so that periodic components of 1/L, 1/m, 1/n, and 1/o times the fundamental period are removed from the displacement signal (wherein L=3, m=5, n=7, o=11). In this embodiment, if the mean pattern period (the mean period of the pattern elements) is assumed to be P, each pattern period, which starts at each location apart from the reference pattern element by a distance equal to P times an integer, includes 16 different phase differences. This grating pattern does not produce 11th- and lower-order distortion components and even-order distortion components. This means that the intensity of diffracted light passing through the grating becomes zero at these orders.

The table shown in FIG. 4 illustrates a method of determining phase differences introduced in the pattern. The phase differences are determined by combinations of four different values P/(2·L), P/(2·m), P/(2·n), and P/(2·o). That is, the phase differences are given as sums of these terms. Thus, in this case, there are sixteen (=2⁴) phase differences. For example, for a combination of "1, 0, 1, 1", the phase difference equals (P/2)·(1/3+1/5+1/11). The arrangement shown in FIG. 3 is determined according to the above rule and thus includes sixteen different phase differences. In this invention, the order of pattern elements from right to left (or from left to right) is not limited to that shown in FIG. 3. The pattern elements may be arranged in any arbitrary order as long as the pattern includes the above combinations of phase differences. Furthermore, the grating part shown in FIG. 3 may be formed on the first grating 1 instead of on the second grating 2.

Figure 5:
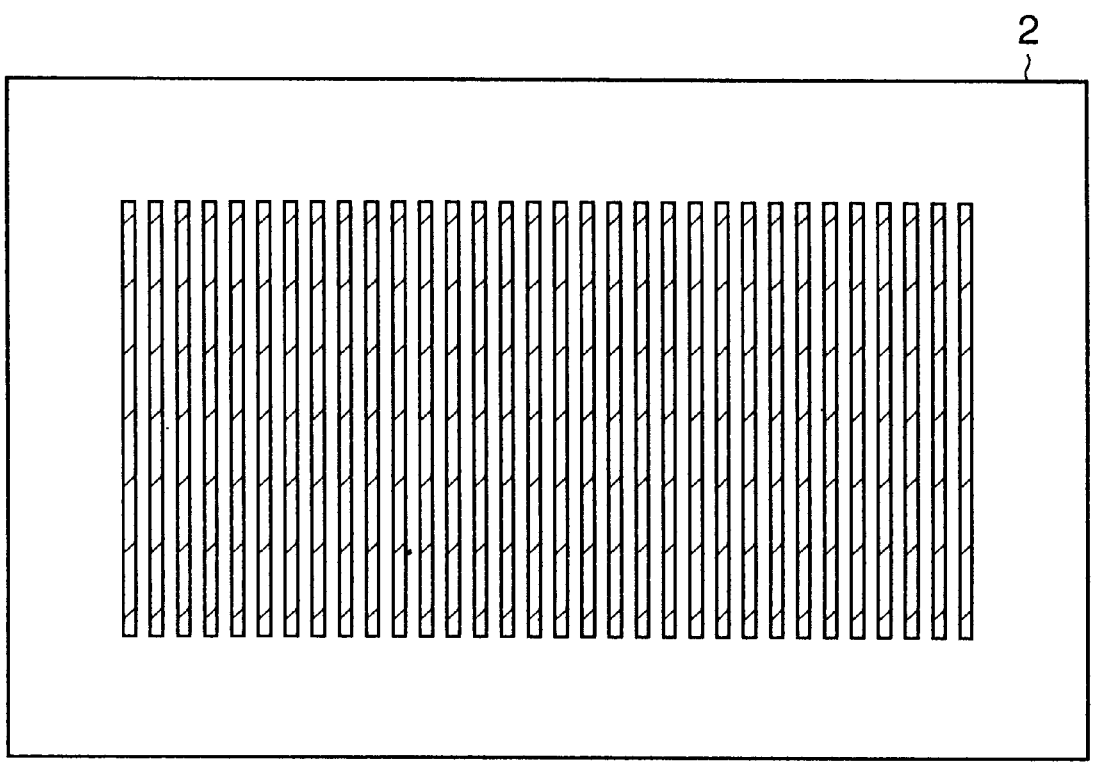
FIG. 5 is a schematic diagram illustrating another example of a grating part for use in the first embodiment shown in FIG. 2.

It is desirable that the spacing between pattern elements varies gradually with the location of pattern elements without an abrupt change. Such a pattern arrangement can be obtained by placing a pattern element having a least phase difference adjacent to a reference pattern 0 and placing other pattern elements so that the phase difference increases with the distance from the reference pattern. In the embodiment shown in FIG. 5, pattern elements are arranged so that the phase difference becomes greatest at the middle between reference patterns 0 and the phase difference decreases with the location toward the reference patterns 0 thereby ensuring that the spacing between adjacent pattern elements varies gradually with the location of pattern elements without an abrupt change.

In this arrangement, one period includes sixteen pattern elements. The grating pattern may include either only one period or two or more periods. In this embodiment, the signal does not contain distortion components of 3rd-, 5th-, 7th-, 9th- and 11th-order harmonics of the fundamental period. Although the signal contains 13th- and higher-order distortion components and also even-order distortion components, the magnitudes of the 13th- and higher-order distortion components are inversely proportional to the square of the order and thus they are very small. Therefore the period division error is less than 0.1%, which is extremely low. Furthermore, when offset voltage is cancelled by taking a difference between the signal and the opposite-phase signal, the even-order distortion components are also cancelled. If it is desired to further remove a 13th-order distortion component, p=13 or P/(2·3) may be introduced into the combinations which determine the phase differences in the pattern. 17th-, 19th-, and higher-order distortion components may also be removed in a similar manner.

The even-order distortion components are removed when a difference between the signal and its opposite-phase signal is taken. Besides, if it is attempted to arrange the pattern in such a manner as to remove the even-order distortion components, as great as a 30% reduction in gain occurs. Therefore, such an attempt is usually useless. However, if it is possible to avoid the reduction in gain, it is desirable to also remove even-order distortion components.

In view of the above, a second embodiment of the invention is disclosed herein below.

Figure 6:
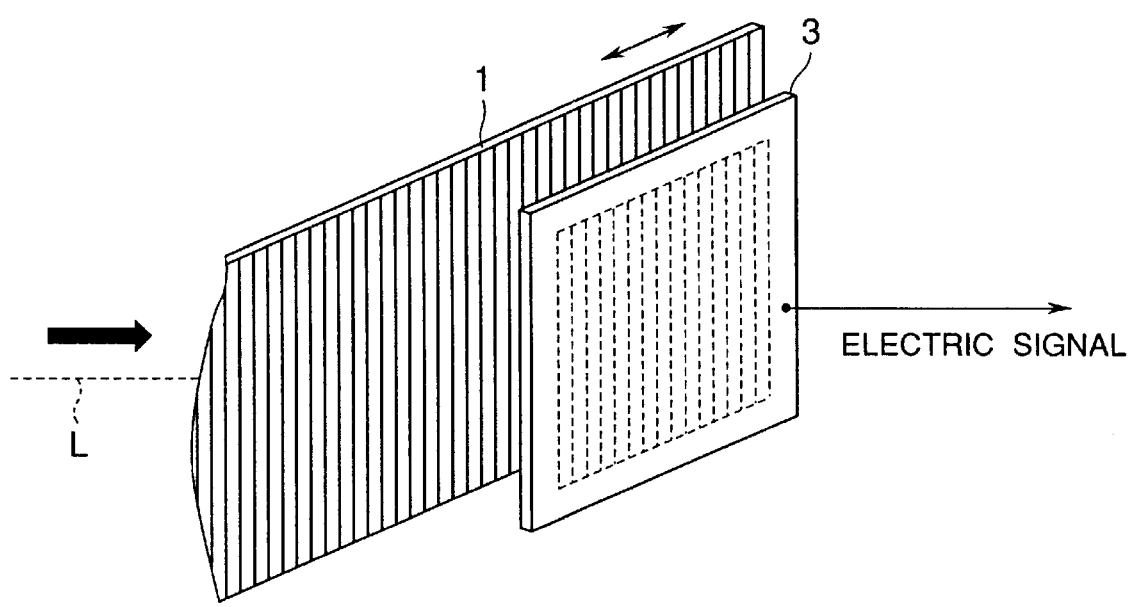
FIG. 6 is a perspective view illustrating a second embodiment of an encoder according to the present invention.

FIG. 6 is a perspective view illustrating an optical encoder according to the second embodiment of the present invention. In FIG. 6, similar elements or portions to those in FIG. 2 are denoted by similar reference numbers, and these are not described here in further detail. The optical encoder shown in FIG. 6 includes a photoelectric conversion device 3 which is illustrated in greater detail in FIG. 7. The photoelectric conversion device 3 shown in FIG. 7 has a pattern in which pattern elements are arranged with a mean spacing of a few $\mu$m to a few hundred $\mu$m so that periodic components of 1/L, 1/m, 1/n, 1/o and 1/p times the fundamental period are removed from the displacement signal (wherein L=3, m=5, n=7, o=11, p=13). In this embodiment, if the mean pattern period is assumed to be P, each pattern period, which starts at each location apart from the reference pattern element by a distance equal to P times an integer, includes 32 different phase differences.

Figure 7:
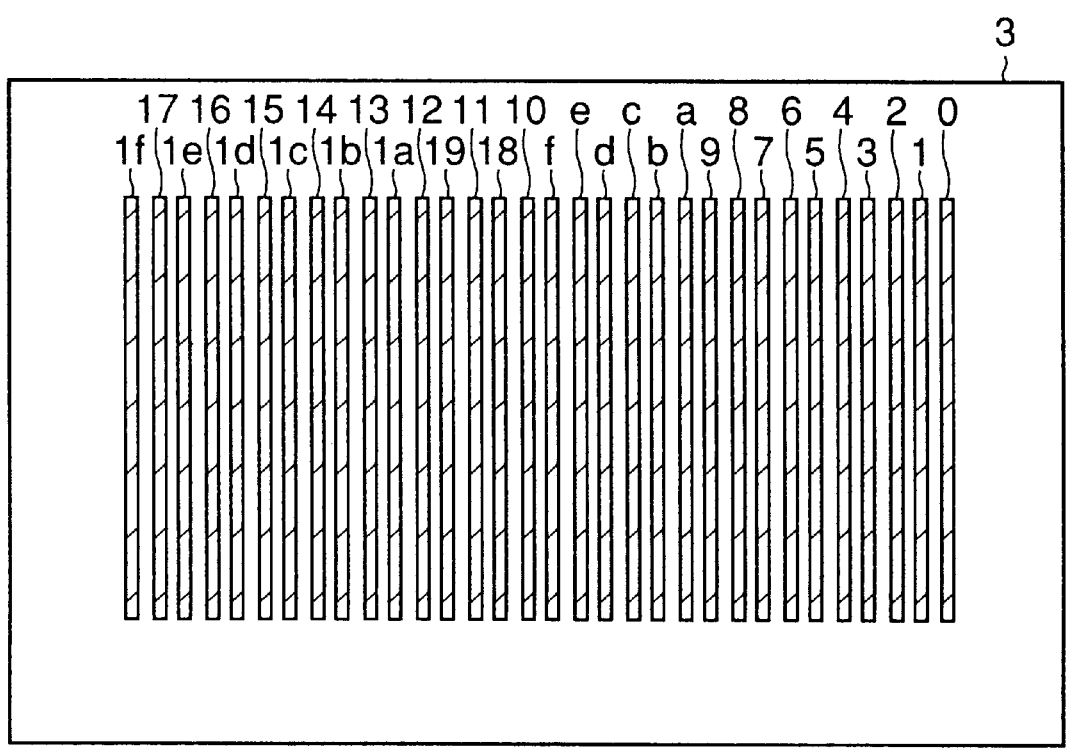
FIG. 7 is a schematic diagram illustrating an example of a photoelectric conversion device for use in the second embodiment shown in FIG. 6.

These phase differences can be determined as shown in the table of FIG. 8. The phase differences are determined by combinations of five different values P/(2·L), P/(2·m), P/(2·n), P/(2·o) and P/(2·p). That is, the phase differences are given as sums of these terms. Thus, in this case, there are 32 (=$2^5$) phase differences. The phase differences are given as the sums of these terms. For example, for a combination of 1, 1, 0, 1, 1, the phase difference is given by (P/2)·(1/3+1/5+1/11+1/13). The arrangement shown in FIG. 7 is determined according to the above rule and thus includes 32 different phase differences.

Figure 9:
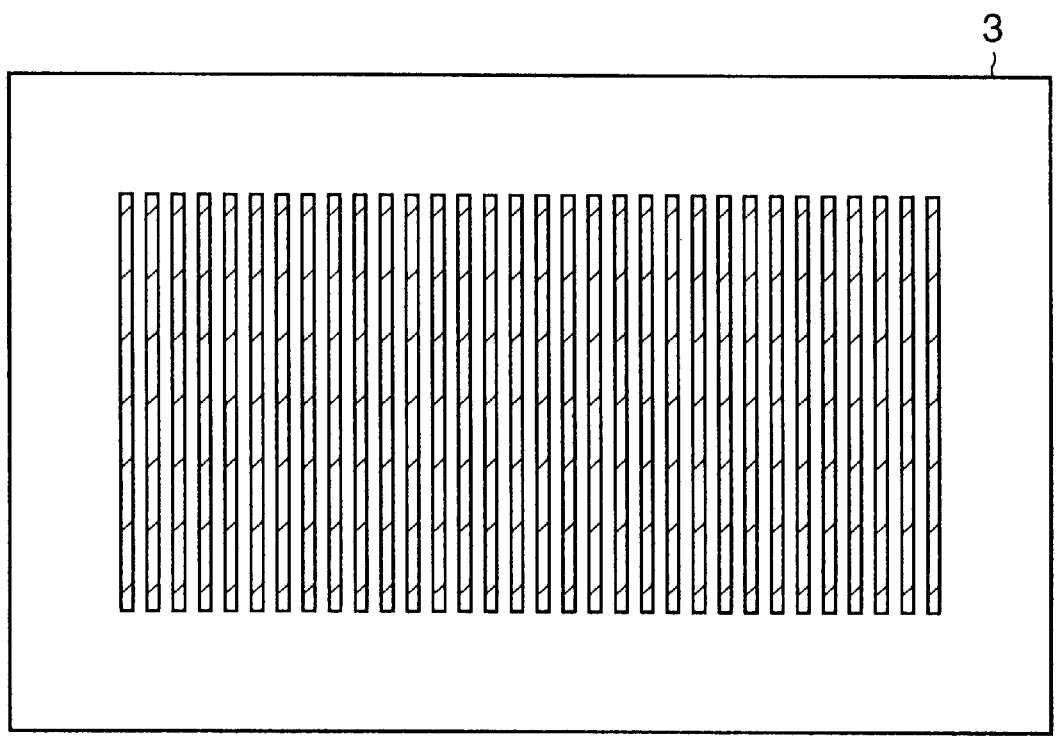
FIG. 9 is a schematic diagram illustrating another example of a photoelectric conversion device for use in the second embodiment shown in FIG. 6.

In this pattern, it is desirable that the spacing between pattern elements varies gradually with the location of pattern elements without an abrupt change. Such a pattern arrangement can be obtained by placing a pattern element having a least phase difference adjacent to a reference pattern 0 and placing other pattern elements so that the phase difference increases with the distance from the reference pattern. In the embodiment shown in FIG. 9, pattern elements are arranged so that the phase difference becomes greatest at the middle between reference patterns 0, and the phase difference decreases with the location toward the reference patterns 0, thereby ensuring that the spacing between adjacent pattern elements varies gradually with the location of the pattern elements without an abrupt change. In this pattern arrangement, the spacing between adjacent pattern elements varies gradually across the pattern without having an abrupt change. This makes it easier to produce the photo-detecting device. Furthermore, crosstalk between photo-detecting elements is minimized and thus optical performance is improved. In this arrangement, one period includes 32 pattern elements. The grating pattern may include either only one period or two or more periods. The pattern arrangement employed here in this second embodiment may also be used in the second grating 2 of the first embodiment.

In this embodiment, the signal does not contain distortion components of 3rd-, 5th-, 7th-, 9th-, 11th-, 13th- and 15th-order harmonics of the fundamental period. Furthermore, the signal contains no even-order distortion components. Therefore, the remaining distortion components are 17th or higher orders, which are of extremely high orders. The magnitudes of these remaining distortion components are inversely proportional to the square of the order and thus they are very small (for example, the magnitude of the 17th-order distortion component is as small as 0.34% of the fundamental component). Therefore the period division error due to the remaining distortion components is negligibly small.

If it is desired to further remove a 17th-order distortion component, q=13 or P/(2·7) may be introduced into the combinations which determine the phase differences in the pattern. 19th-, 21th- and higher-order distortion components may also be removed in a similar manner. In this embodiment, the signal no longer includes even-order components at the stage before taking the difference between the signal and the opposite-phase signal. As a result, it is possible to obtain a high-quality signal without having a loss in gain.

To achieve high resistance to the environment, the photoelectric conversion device 3 may be molded with resin, or may be housed in a can package. Or otherwise, the photoelectric conversion device 3 may also be housed in a ceramic or metal package in such a manner that the photo-detecting surface of the photoelectric conversion device is protected by glass or resin.

Now, a third embodiment of the invention will be described below. In the embodiments described above, the phase differences in the grating pattern determined by combinations of L, m, n, o, p, . . . (L=3, m=5, n=7, o=11, p=13) are selected to remove 15th- and lower-order distortion components as well as even-order distortion components. In the above embodiments, there is no pattern element for removing the 9th-order distortion between the 7th- and 11th-order pattern elements because the 9th-order component is a multiple of the 3rd-order component and thus the 9th-order distortion component is removed by the 3rd-order pattern element.

The reason for that will be described below. The phase of pattern element for removing kth-order distortion with respect to the phase of the reference pattern element is given by:

$$k \cdot 2\pi(x/p+1/2k')=k \cdot 2\pi x/p+k \cdot 2\pi/2k' \qquad (1)$$

where k denotes the order of distortion component to be removed, and k' denotes the phase coefficient of the pattern element.

If k=9 is substituted into Eq. (1) to obtain the phase for the 9th-order pattern element, and if 9 is selected as the value of k', then the second term of the equation (1) becomes $\pi$. However, $3\pi$, $5\pi$, $7\pi$, $9\pi$, $11\pi$, $13\pi$, . . . are all equivalent in phase to $\pi$. Thus, in a more general form, values of k' which satisfy the following equation (2) are all equivalent.

$$k/k'=1, 3, 5, 7, 9, 11, 13, \qquad (2)$$

or $$k'=k, k/3, k/5, k/7, k/9, k/11, k/13 \qquad (3)$$

In the equation (2) or (3), k should be a positive odd number and k' should be a positive integer. Thus, k' is restricted to certain values. That is, k' should be equal to an (odd number)/(odd number) and thus k' should be an odd number. For the case of 9th-order pattern element, k' can be 9 or 3. Since 9 and 3 are equivalent in phase, we can select 3. Since 3 is already selected for the 3rd-order pattern element, the 3rd-order pattern element can also serve as a 9th-order pattern element. Furthermore, in the case of 15th-order pattern element, k'=15, 5, 3. Thus, k' can be 3 or 5. However, both 3 and 5 are already selected for the 3rd- and 5th-order pattern elements, respectively, and thus these two pattern elements also serve as a 15th-order pattern element. In other words, the above-described set of values which are allowed as a value for k' includes a prime number (or prime numbers), and the prime number (one of prime numbers) can be selected for the present purpose. When k is a prime number, k' always becomes equal to k. On the other hand, when k is not a prime number, a prime number is selected as k'. In any case, it is sufficient to select a prime number for k'.

The optical grating according to the present invention can be applied not only to an optical encoder but also to a wide variety of optical applications such as a spectroscope, a wavelength measuring instrument, the separation of light, the detection of a diffraction angle, etc. Furthermore, the encoder according to the present invention can be applied to the optical encoder described above but also to various types of encoders such as magnetic, electromagnetic, and electrostatic types. The invention can be applied to both linear and rotary encoders. Furthermore, in the present invention, the pitch of the first scale may be either equal to the mean pitch of the second grating or different from that. For example, the ratio of pitches may be 1:2. As described above, the present invention provides an optical grating of the transmission binary amplitude grating type having a simple structure which produces less distortion than conventional optical gratings. The encoder of the present invention provides an output signal including very low distortion and it can be employed to perform high-accuracy position measurement in various applications such as high-precision machine tools. Since such high-accuracy measurement can be achieved very easily, a great improvement in the productivity is also achieved.

What is claimed is:

1. A transmission amplitude grating comprising a grating having a plurality of laterally adjacent slits arranged in a pattern so as to form pattern elements including a reference pattern element having a reference phase and in which spaces between adjacent pattern elements vary in phase relative to said reference phase of said reference pattern element by amounts of at least $P/(2 \cdot L)$, $P/(2 \cdot m)$, $P/(2 \cdot n)$, and $P/(2 \cdot o)$, wherein L, m, n, and o are positive integers and P is a mean period of said pattern elements, and by amounts of combinations of sums of these values.

2. The transmission amplitude grating of claim 1, wherein L, m, n, and o are prime numbers.

3. The transmission amplitude grating of claim 1, wherein said pattern elements are arranged at locations with 16 or 32 different phase differences starting from a location apart from said reference pattern element having said reference phase by an amount of an integer times P.

4. The transmission grating of claim 1, wherein said pattern elements are arranged such that one of said pattern elements, having a minimum phase difference, is disposed adjacent to said reference pattern element, the phase difference increasing with the distance from said reference pattern element.

5. An encoder for detecting a relative position comprising:

a first scale; and a second scale for movement relative to said first scale;

wherein one of said first and second scales has a scale pattern comprising pattern elements that include a reference pattern element having a reference phase and that are arranged such that spaces between adjacent ones of said pattern elements vary in phase relative to the reference phase of the reference pattern element by amounts of at least $P/(2 \cdot L)$, $P/(2 \cdot m)$, $P/(2 \cdot n)$, $P/(2 \cdot o)$, wherein L, m, n, and o are positive integers and P is a mean period of said pattern elements, and by amounts of combinations of sums of these values.

6. An encoder for detecting a relative position, comprising:

a first scale having a pattern and a pattern width; and a photo-detecting device for movement relative to said first scale;

wherein said photo-detecting device has a photo-detecting pattern formed thereon comprising pattern elements comprising a reference pattern element having a reference phase, said pattern elements having a width corresponding to the pattern width of said first scale and being arranged such that spaces between adjacent pattern elements vary in phase relative to the reference phase of the reference pattern element by amounts of at least $P/(2 \cdot L)$, $P/(2 \cdot m)$, $P/(2 \cdot n)$, $P/(2 \cdot o)$, and $P/(2 \cdot p)$, wherein L, m, n, o, and p are positive integers and P is a mean period of said pattern elements, and by amounts of combinations of sums of these values.

7. The encoder of claim 6, wherein said L, m, n, o, and p are prime numbers.

8. The encoder of claim 6, wherein said pattern elements are arranged such that one of said pattern elements, having a minimum phase difference, is disposed adjacent to said reference pattern element, the phase difference increasing with the distance from said reference pattern element.

* * * * *